United States Patent [19]

Katagiri et al.

[11] 3,964,079

[45] June 15, 1976

[54] BRAKE FLUID RESERVOIR INCLUDING FLUID LEVEL INDICATOR

[75] Inventors: Masayoshi Katagiri; Jiro Kizaki, both of Toyota, Japan

[73] Assignee: Toyota Jidosha Kogyo Kabushiki Kaisha, Japan

[22] Filed: Mar. 25, 1975

[21] Appl. No.: 561,688

[30] Foreign Application Priority Data
Aug. 28, 1974   Japan.............................. 49-97968

[52] U.S. Cl. .......................... 340/244 E; 200/84 R; 340/59
[51] Int. Cl.² ........................................ G08B 21/00
[58] Field of Search ................ 340/244, 59; 200/84

[56] References Cited
UNITED STATES PATENTS

| | | | |
|---|---|---|---|
| 1,288,855 | 12/1918 | Faber................................ | 200/84 R |
| 2,448,096 | 8/1948 | Hardin.............................. | 200/84 R |
| 3,436,727 | 4/1969 | Pagano, Sr.................. | 340/244 A X |
| 3,479,639 | 11/1969 | Randol................................ | 340/59 |
| 3,691,522 | 9/1972 | Hocking et al. .................. | 340/59 X |
| 3,849,770 | 11/1974 | Hayashida....................... | 340/244 E |

*Primary Examiner*—John W. Caldwell
*Assistant Examiner*—Daniel Myer
*Attorney, Agent, or Firm*—Toren, McGeady and Stanger

[57] ABSTRACT

A fluid reservoir is partitioned by a diaphragm into a liquid phase portion and a vapor phase portion with the diaphragm being moved in accordance with the liquid level in the liquid phase portion of the reservoir. An operating rod mounted to move with the diaphragm is engaged by sensing means which operate to produce a signal indicative of liquid level in response to the position of the operating rod. The operating rod may be composed partially of electrically conductive material and partially of electrically nonconductive material in order to open and close an external electrical signal circuit in accordance with its position relative to the level of liquid within the reservoir.

2 Claims, 3 Drawing Figures

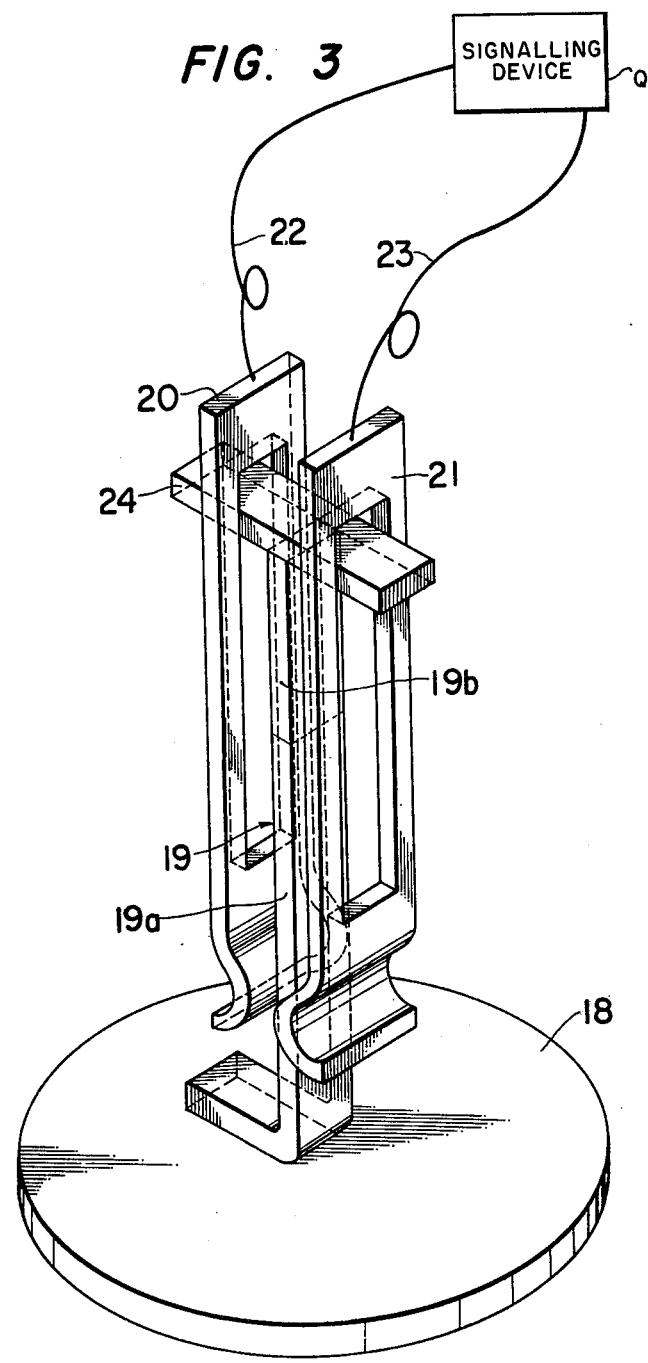

BRAKE FLUID RESERVOIR INCLUDING FLUID LEVEL INDICATOR

BACKGROUND OF THE INVENTION

The present invention relates generally to fluid reservoirs, and more particularly to a reservoir for the hydraulic fluid of an automobile braking system. More specifically, the invention relates to a detection device for signalling a low level of brake fluid within the reservoir.

Systems utilizing the pressure of a hydraulic brake fluid are widely used in automotive braking devices. In such systems, a master cylinder having a piston which is actuated by a force applied on the brake pedal of the vehicle operates as the hydraulic pressure generating source. Proper operation of the braking system and, consequently, safety considerations in the operation of the vehicle, depend upon the presence of a sufficient level of hydraulic fluid within the braking system. Accordingly, means are usually provided for determining the level of the braking fluid within a liquid reservoir of the braking system which is usually provided as part of the master cylinder. More particularly, such means must operate to issue a warning signal when the fluid level within the master cylinder reservoir drops below a required level for safe and effective operation.

In one known prior art system, a reservoir tank containing the hydraulic brake fluid includes a float mechanism operating to sense the level of the braking fluid within the reservoir. This system utilizes a reed switch to signal a low level of hydraulic fluid in accordance with the position of the float. When, in such a system, the fluid level within the reservoir tank drops to a predetermined position, the reed switch is actuated by magnetic means contained within the system and a signal is generated by an external signal device to indicate that the brake fluid must be replenished.

However, in such a device, the liquid phase portion and the vapor phase portion of the reservoir are not separated. Thus, moisture in the atmospheric air may be absorbed by the brake fluid. This gives rise to several problems, including, for example, lowering of the boiling point of the brake fluid.

Thus, it has been found advantageous to maintain the liquid portion and the vapor portion of the brake fluid reservoir separated. Efforts to provide a structure involving separated liquid and vapor portions have, however, encountered substantial difficulty. First, the presence of a reed switch holding tube substantially at the center of the reservoir and the necessity for a float responsive magnet for actuating the reed switch, have caused space problems. Accordingly, with presently known structures, it has been difficult to overcome the problems involved in separating the liquid portion from the vapor portion of the brake fluid reservoir without introducing other disadvantages.

The present invention is directed toward overcoming the problems which arise when the liquid portion and the vapor portion of a brake fluid reservoir tank are not partitioned. In accordance with the present invention, means are provided for partitioning the reservoir to overcome the aforementioned difficulties without introducing other attendant problems.

SUMMARY OF THE INVENTION

Briefly, the present invention may be described as a fluid reservoir particularly suitable for containing the brake fluid of a vehicle comprising fluid container means, diaphragm means separating said container means into a liquid chamber and a vapor chamber, means mounting said diaphragm means to move in accordance with the quantity of liquid contained within said liquid chamber, rod means mounted for movement together with said diaphragm means, and sensing means fixed relative to said container means for sensing the position of said rod means to generate a signal indicative of the quantity of liquid within said liquid chamber.

In the preferred embodiment of the present invention, the rod means comprise an elongated rod mounted to a diaphragm which is located within the reservoir or container means and which effectively isolates the liquid phase portion of the fluid container from the vapor phase portion. The rod is composed partially of electrically conductive material and partially of electrically nonconductive material. A pair of contact members fixed relative to the reservoir are arranged in sliding contact with the rod. The contact members form part of an external circuit containing a signalling device for generating a signal in accordance with the position of the rod relative to the contact members. When the contact members are engaged across the portion of the rod composed of electrically conductive material, the external signalling circuit will be closed. When the nonconductive portion of the rod is engaged by the contact members, the external circuit will be opened. Accordingly, a signal may be generated indicating the level of fluid within the reservoir.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWINGS

In the drawings:

FIG. 3 is an enlarged perspective view of essential portions of the device of the present invention depicted in FIG. 2.

DETAILED DESCRIPTION OF THE PREFERRED EMBODIMENT

Figure 1:
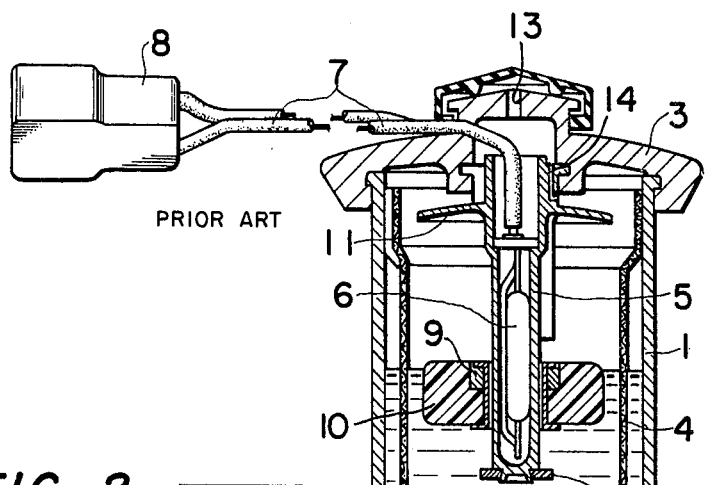
FIG. 1 is a longitudinal sectional view of a prior art brake fluid reservoir system.

Before describing the preferred embodiment of the present invention, reference is made to FIG. 1 wherein there is depicted the prior art system previously discussed. In the prior art system of FIG. 1 a reservoir tank 1 arranged to communicate with a brake system master cylinder (not shown) through an aperture 2 includes a cap member 3 and a filter 4 composed of a nylon net operating to prevent dust in the braking fluid from becoming introduced into the master cylinder. A reed switch holding tube 5 is vertically arranged substantially at the center of the reservoir 1 and a reed switch 6 is disposed therein. Lead wires 7 of the reed switch 6 extend through the cap 3 to an external connector 8. A magnet 9 operates to actuate the reed switch 6. The magnet 9 is mounted upon a float 10 whose position is determined in accordance with the level of brake fluid within the reservoir tank 1.

A baffle 11 for preventing blowing-off of fluid is provided and a stopper 12 prevents the float 10 from falling from its position upon the tube 5. Air vents 13 and 14 operate to establish flow communication between the vapor phase portion of the reservoir tank 1 and atmospheric air. When, in a brake fluid reservoir thus constructed, the level of fluid within the reservoir tank 1 drops below a predetermined level, the reed switch 6 is actuated by the magnet 9 mounted upon the float 10. Signalling means provided externally of the reservoir tank 1 may thus be actuated to generate a signal indicating that the brake fluid within the reservoir must be replenished.

However, as will be noted from the prior art structure previously described, the liquid phase portion and the vapor phase portion are not separated. Thus, moisture absorbed by the brake fluid from atmospheric air may cause the problems previously discussed.

Figure 2:
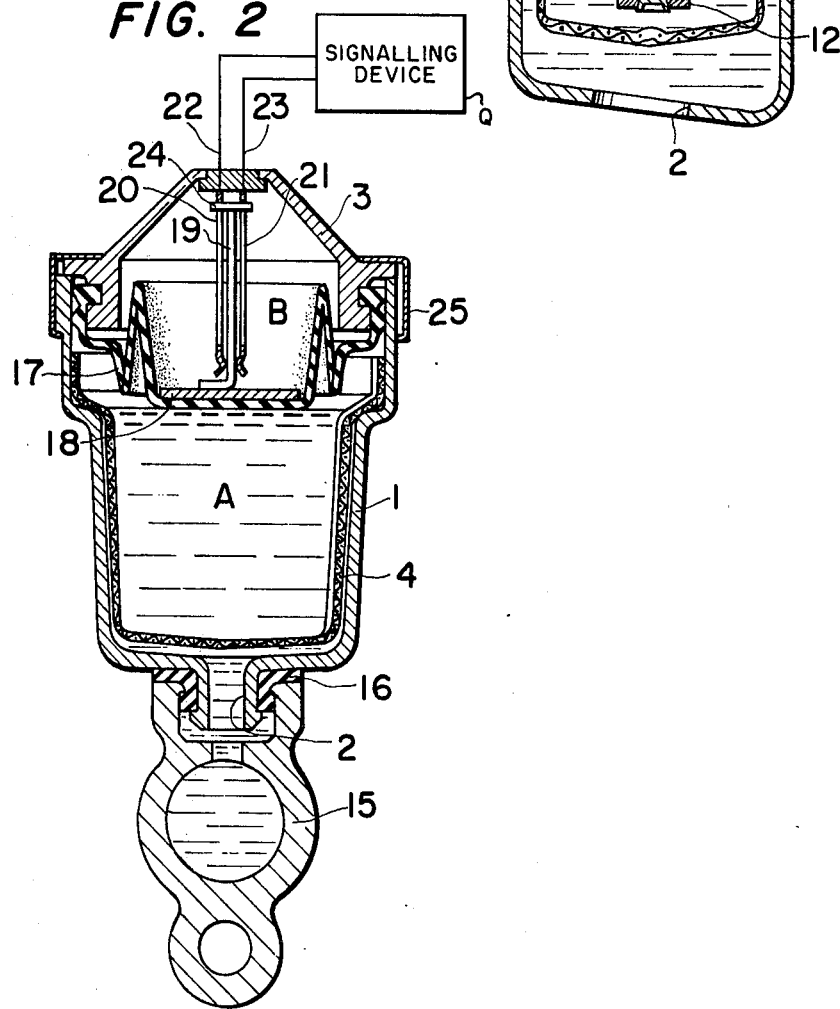
FIG. 2 is a longitudinal sectional view of a brake fluid reservoir system in accordance with the present invention.

The present invention is depicted in FIGS. 2 and 3. In these Figures, reference numerals identical to those used in connection with FIG. 1 will be utilized for purposes of clarity to identify parts similar to those depicted in FIG. 1. Referring to FIGS. 2 and 3, it will be seen that the present invention comprises a reservoir tank 1 having a cap 3 and a filter 4. A master cylinder 15 is connected through packing means 16 to an opening 2 in the reservoir tank 1.

In accordance with a principal feature of the present invention, the reservoir tank 1 is provided with diaphragm means 17 separating or partitioning the reservoir into a liquid phase portion or chamber A and a vapor phase portion or chamber B. The diaphragm 17 is mounted within the tank or container 1 in such a manner as to be movable in accordance with the level of brake fluid contained within the liquid chamber A. More specifically, it will be seen that the diaphragm 17 is mounted between the body of the tank 1 and the cap 3 thereby sealing the liquid chamber A from the exterior of the tank 1 and from the vapor chamber B. Thus, brake fluid in its liquid phase is prevented, not only from evaporating to the vapor phase portion of the tank but also from evaporating to the exterior of the reservoir due to removal of the cap 3.

A disc 18 is placed on the diaphragm 17 and an operating rod 19 is attached to the disc 18 and it extends vertically upwardly therefrom. It will be seen from the construction depicted that the disc 18 and the rod 19 will move vertically upwardly and downwardly in accordance with upward and downward movement of the diaphragm 17 in response to changes in the level of liquid contained within the chamber A.

It should be noted that by changing the weight of the disc 18, the liquid level responsive properties of the diaphragm 17 can be regulated or adjusted.

The operating rod 19 is longitudinally divided into an electrically conductive portion 19a and an electrically nonconducting portion 19b.

The device of the invention includes sensing means provided in the form of a pair of contact members 20 and 21 which are slidably maintained in contact with both sides of the operating rod 19. Of course, it should be understood that it is within the scope of the present invention to reverse the parts 19a and 19b and to form the lower part 19a from nonconductive or insulating material with the part 19b being formed from conductive material.

Each of the contact members 20 and 21 are arranged to form part of an external circuit including lead wires 22 and 23 which extend outwardly from the assembly to establish electrical contact with an external signalling device Q.

Each of the contact members 20 and 21 are formed in a slotted configuration and a stopper member 24 is mounted upon the operating rod 19 for limiting the range of movement of the rod 19 relative to the contact member 20 and 21. It will be seen that as the stopper 24 becomes engaged with the upper or lower terminal portions of the slots formed in the contact members 20 and 21, movement of the rod 19 relative to members 20 and 21 will be prevented in a given direction.

Additionally, the assembly of FIG. 2 includes a retainer member 25 for maintaining the cap 3 in sealing engagement with the reservoir tank 1.

When in the structure of the present invention the level of the brake fluid within the reservoir drops to below a predetermined level, the contact pieces 20 and 21 will become engaged across the portion 19b of the operating rod 19. Depending upon whether this portion is formed of conductive or nonconductive material, a signal will be generated to indicate that the fluid has reached the predetermined level. For example, if the portion 19b is nonconductive, the circuit established through the contact members 20 and 21 by the conductive portion 19a will be broken when the fluid level drops sufficiently to bring portion 19b into contact between the members 20 and 21. The change which thus occurs in the external signal circuit will provide a sensed condition enabling the generation of a signal indicating that the fluid has achieved a predetermined level.

Thus, it will be seen that in the present invention since the reservoir tank is constructed with the liquid phase portion and the vapor phase portion isolated by the sealed engagement of the diaphragm 17, the brake fluid will be unable to blow-off to the exterior of the assembly. Additionally, the operating rod 19 and the sensing means comprising the contact members 20 and 21 may be located to extend within the vapor chamber of the device and thus the overall construction of the assembly may be simplified.

Furthermore, it should be understood that although the preferred embodiment of the invention depicted and described herein is composed of an operating rod in a pair of contact members, it will be obvious to those skilled in the art that the generation of the signal representative of fluid level may be accomplished in various forms in accordance with the positioning of the operating rod within the scope of the present invention without departing therefrom.

While a specific embodiment of the invention has been shown and described in detail to illustrate the application of the inventive principles, it will be understood that the invention may be embodied otherwise without departing from such principles.

What is claimed is:

1. A fluid reservoir particularly suited for containing brake fluid of a vehicle comprising container means, diaphragm means separating said container means into a liquid chamber and a vapor chamber, means mounting said diaphragm means to move in accordance with the quantity of liquid contained within said liquid chamber, an elongated rod having a portion of its length composed of electrically conductive material and another portion of its length composed of electrically nonconductive material, said rod being mounted at one end thereof for movement together with said diaphragm means, a pair of generally elongate contact members both composed of electrically conductive material fixed relative to said container means and extending generally along the direction of movement of said diaphragm means alongside said rod on opposite sides thereof, a contact portion on each of said contact members each located on an opposite side of said rod and engaging said rod therebetween in sliding abutment therewith, slot means defined in each of said contact members and extending therealong in the general direction of movement of said diaphragm means, a stop member affixed to said rod extending to within said slot means and adapted to slide therealong as a result of relative movement between said rod and said contact members, said stop member being arranged to abut the ends of said slot means to limit the degree of relative movement which may be effected between said rod and said contact members by movement of said diaphragm means in response to changes of the liquid level within said liquid chamber, and electrical circuit means including electrical signal generating means electrically connected across said contact members to generate a signal indicative of the liquid level within said liquid chamber, said rod being engaged between said contact portions of said contact members such that said electrically conductive and said electrically nonconductive portions of said rod may be individually placed in abutting relationship between said contact portions as said diaphragm means moves in response to changes of said liquid level within said liquid chamber, with operation of said electrical signal generating means to emit a signal indicative of said liquid level being controlled in accordance with the portion of said rod in engagement between the contact portions of said contact members.

2. A fluid reservoir according to claim 1 including a disc fixed upon said diaphragm means and having said rod means attached thereto.

* * * * *